July 27, 1926.

E. R. MOSHER 1,593,946

AUTOMATIC GEAR SHIFT CONTROL

Filed Sept. 29, 1925       4 Sheets-Sheet 1

Fig.1.

Inventor
Elmer R. Mosher

Attorneys

July 27, 1926.

E. R. MOSHER

1,593,946

AUTOMATIC GEAR SHIFT CONTROL

Filed Sept. 29 1925   4 Sheets-Sheet 2

Patented July 27, 1926.

1,593,946

UNITED STATES PATENT OFFICE.

ELMER R. MOSHER, OF WEST ENDICOTT, NEW YORK.

AUTOMATIC GEAR-SHIFT CONTROL.

Application filed September 29, 1925. Serial No. 59,375.

This invention relates to improvements in change speed gearing.

The primary object of this invention is the provision of an automatically operated transmission controlling mechanism for motor vehicles, embodying a practical arrangement which may be used with conventional change speed gearing to practically effect the drive of the motor vehicle in forward speeds, with an automatic shift for such speeds.

A further object of this invention is the provision of a novel type of centrifugal governor operated automatic gear shift for transmission mechanisms of automotive vehicles and the like.

Other objects and advantages of this invention will be apparent during the course of the following detailed description.

In the drawings, forming a part of this specification, and wherein similar reference characters designate corresponding parts throughout the several views.

In the drawings, wherein for the purpose of illustration is shown only a preferred embodiment of the invention, the letter A may generally designate the automatic transmission controlling mechanism, which cooperably includes the engine shaft B'; drive shaft B for selective connection with the shaft B' by means of a clutch mechanism D. A driven shaft C is provided for geared connection with the drive shaft B by means of a transmission or change speed mechanism E, preferably of a conventional type. The automatic features of the improved transmission mechanism A include the centrifugally operated governor F cooperatively connected with the shaft C and means G cooperatively connected with clutch D; gearing E; and governor F to cause the automatic shift of gears from low forward to intermediate forward and high forward speeds. A manual shift and gear lock mechanism H are provided for operative connection with the above mentioned details of the invention to be subsequently detailed.

Figure 1:
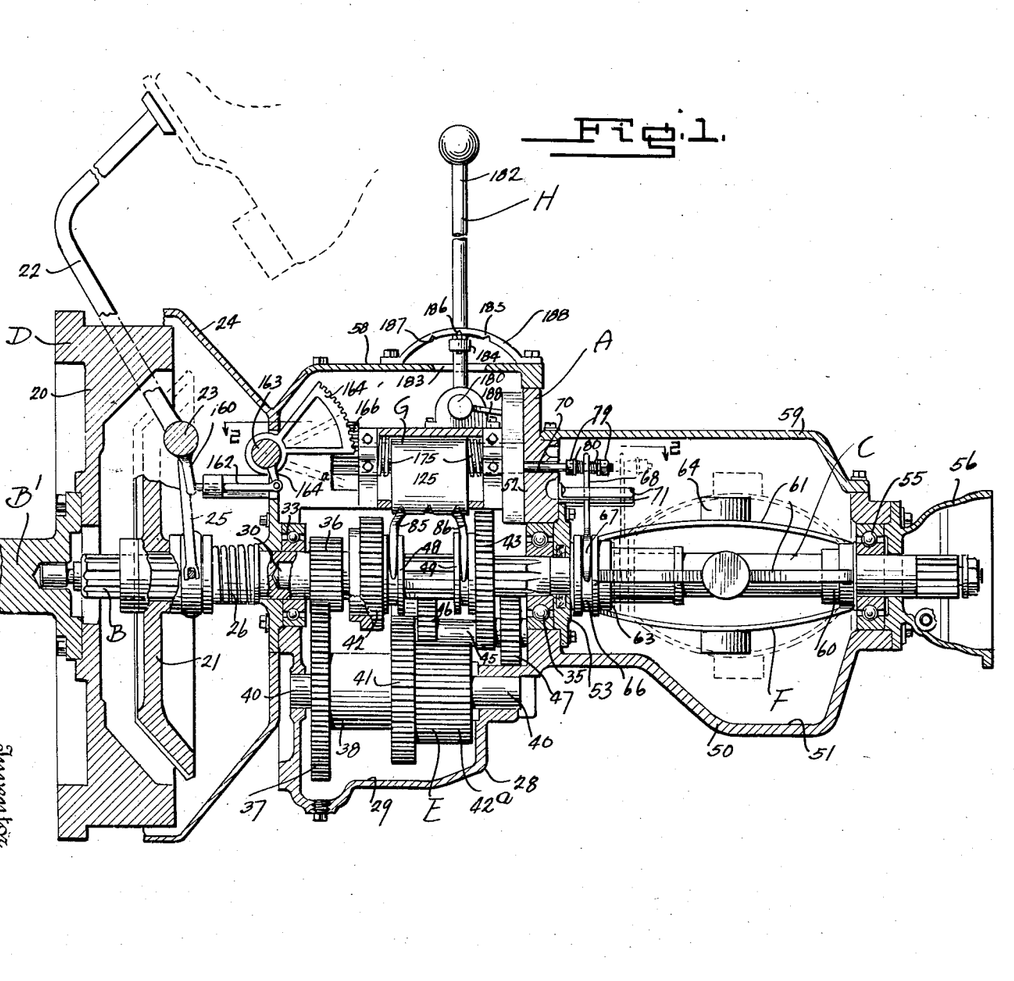
Figure 1 is a longitudinal sectional view taken through the improved automatic change speed mechanism.

As in conventional construction the engine shaft B' includes a clutch part 20, which cooperates with a sliding clutch part 21 splined upon the drive shaft portion B, as is illustrated in Figure 1. A pedal or analogous operating lever 22 of the clutch D is pivoted at 23 upon the clutch casing 24, and includes a fork 25 pivoted to the clutch part 21 in conventional manner. A spring 26, of the compression type, normally urges the clutch parts 20 and 21 into frictional clutching engagement to connect the shafts B and B' together for a direct drive.

Referring to the transmission or change speed gearing E, the same is mounted in a suitable housing 28 suitably connected to the clutch housing. In the compartment 29 of this housing 28 are rotatably supported the shafts and gearing of the transmission mechanism E. The driven shaft C has a step bearing 30 in a socket at the end of the drive shaft B which extends into the housing 28, as is illustrated in Figure 1, and which is conventional construction; it being understood that the shaft B is supported as by bearing means 33 in the fore end of the housing compartment 29. The shaft C extends transversely thru the compartment 29 and is rotatably supported by bearing 35 at the opposite side of the housing from the step bearing 30 thereof.

The shaft B in the housing 29 is provided with a small gear 36, which meshes with a large gear 37 keyed upon a counter shaft 38; the counter shaft 38 being supported at its ends 40 in the housing 28, as illustrated in Figure 1. The counter shaft 38 also supports gears 41 and $42^a$, of different pitches than each other, and each of different pitch than the gear 37. Gears 42 and 43 are independently splined on the driven shaft C; the gear 42 upon its outer periphery having teeth to cooperate in meshing relation with the teeth of the gear 41, and on its inner face being provided with gear teeth to receive the teeth of the gear 36, to effect a direct drive between the drive and driven shafts B and C, commonly known as high speed. The gear 43 is adapted for meshing with the gear $42^a$ of the counter shaft 38, to effect what is commonly known as low forward speed; and when the gears 41 and 42 mesh second forward speed is effected.

A third shaft 45 is rotatably mounted in the housing 28, known as the reverse speed shaft, and includes a gear 46 normally meshing with the gear 42. A second gear 47 is keyed on the shaft 45, and in position to be meshed with the gear 43 as the latter is slid upon its shaft C to effect a reverse drive of the shaft C.

The above features are quite commonly understood in the art with respect to conventional transmission mechanisms, and the gears 41 and 42 are provided with grooved collars 48 and 49 respectively adapted to receive shifting force, as will be subsequently described.

Since the automatic feature of the gear shift is of the governor operated type, it is preferred to provide a governor housing 50, as an extension of the housing 28, and providing a compartment 51 therein thru which the drive shaft C extends. A partition wall 52 is of course interposed between the compartments of the housings 28 and 50, and a stuffing box or packing ring 53 may be provided upon the wall 52 about the shaft C. to prevent leak of the grease or lubricant from the compartment 29 into the governor compartment 51. The shaft C at the end of the housing 50 opposite the bearing 35 is provided with an anti-friction bearing 55 for supporting the same, and a suitable universal joint housing 56 may be attached at the end of the governor housing 50, into which the shaft C extends. Both the transmission and the governor housings 28 and 50 include covers 58 and 59 respectively, as a means of access to the compartments 29 and 51.

In the compartment 51, adjacent the bearing 55, the shaft C has keyed thereto a sleeve or like member 60, to which an end of each of a plurality of governor springs 61 are attached. The governor springs 61 are of the resilient leaf type, and extend from the keyed connection 60 to a member or sleeve 63 which is splined or feathered, or otherwise slidably mounted upon the driven shaft C for longitudinal movement thereon. The springs 61 intermediate the collars or members 60 and 63 each support a weight 64, in accordance with conventional construction. The splined or slidable member 63 has a grooved collar 66 thereon, which receives in the groove thereof a fork 67; said fork 67 including a shank 68 having an eye at the upper end therethrough adapted to receive a reciprocating plunger or shaft 70 therethrough. It is readily apparent that upon increased speed of the shaft C the springs 61 will be flexed outwardly incident to centrifugal force, and move the collar 66 towards the connection 60 of said springs, and this moves the fork 67 and the shank 68 longitudinally of the shaft C away from the transmission mechanism, and pulls the plunger or shaft 70 therewith. The shank 68 is guided between guide fingers 71, if preferred, and the shank 68 may have a connection with the plunger or shaft 70 as by means of providing nuts 79 at opposite sides of the shank, with yieldable coil springs 80 between said nuts and the eye of the shank 68. In this manner shock upon the governor springs and the shaft 70 is prevented, and the springs 80 are of a nature which will permit a limited flexing of the governor arms when the plunger 70 is held stationary, although this motion is not such as to interefere with the operation of the automatic feature of the invention to be subsequently described. If desired, the coil springs 80 may be entirely eliminated and the washers clamped by the nuts 79 directly against the shank 68.

Figures 2, 3, 4, 5:
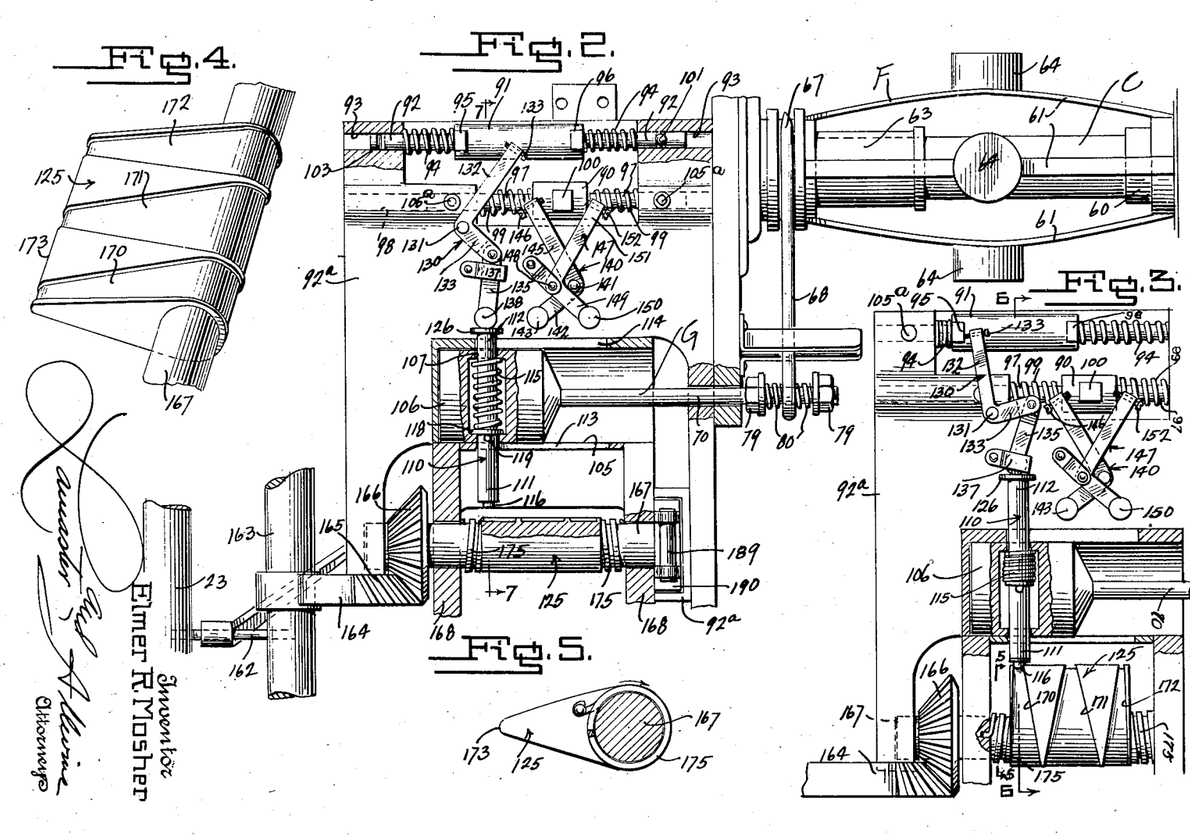
Figure 2 is a fragmentary enlarged sectional view taken substantially on the line 2—2 of Figure 1, and showing the improved features which render the shift of the gears of the transmission mechanism automatic.
Figure 3 is a fragmentary view of the details illustrated in Figure 2, with a different operated position.
Figure 4 is a fragmentary perspective view of a novel type of cam used in connection with the automatic gear shift.
Figure 5 is a cross sectional view showing the improved cam of Figure 4, this view being taken substantially on the line 5—5 of Figure 3.

Referring now to the means G, it is preferred to provide shifting forks 85 and 86 respectively for the gears 42 and 43. At the free or outer ends of the shifting members 85 and 86, the same are respectively provided with cross members 90 and 91, which are reciprocably supported in a parallel relation by the frame $92^a$; the latter being supported in any approved manner by the housing 28. As is illustrated in Figure 2 of the drawings, the member 91, which is connected with the shift fork 86 is provided with reduced ends 92 slidably mounted in passageways 93 of the frame $92^a$. Compression springs 94 are disposed over these reduced ends 92, engaging between the frame $92^a$ and enlarged body portion of the head or member 91, to retain the latter in such position that it will position the gear 43 which it controls, in a neutral location with respect to cooperating gears 42 and 47. Suitable lugs or extensions 95 and 96 are provided on this member or head 91 for cooperation with details to be subsequently described with the means of moving the gear 43 into low forward speed in cooperating position with the gear $42^a$, and reverse drive when meshing with the gear 47. In similar manner the head or member 90 of the gear shift lever 85 is provided with reduced ends 97 bearing in suitable passageways 98 of the frame $92^a$; compression springs 99 being provided for operation against the body of the member 90 and the frame $92^a$ to position the gear shift lever 85 so that the gear 42 which it controls is located in neutral between its cooperating gears 36 and 41, in the position illustrated in Figure 1. The member 90 is provided with an extension 100 adapted to cooperate with details of the automatic gear shift means to be subsequently described.

Figures 6, 7:
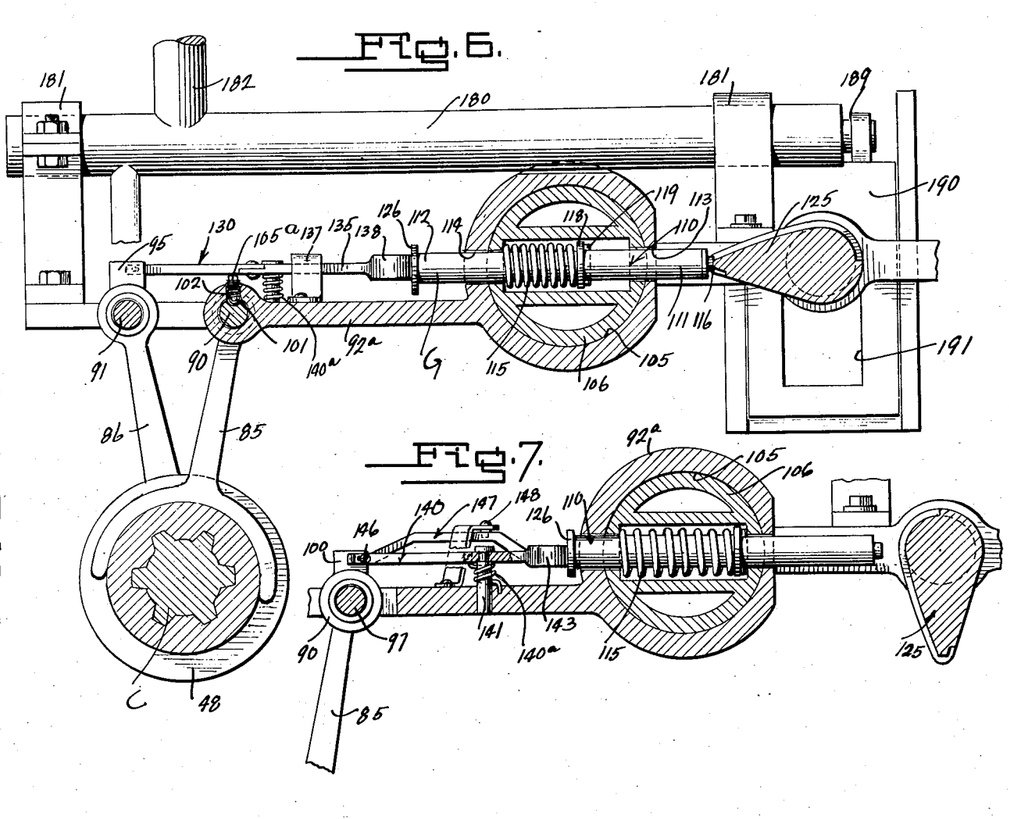
Figure 6 is an enlarged sectional view taken through the details of the automatic gear shifting mechanism substantially on the line 6—6 of Figure 3.
Figure 7 is a view showing details similar to the details of Figure 6, with a different operating position, this view being taken substantially on the line 7—7 of Figure 2.
Figure 8:
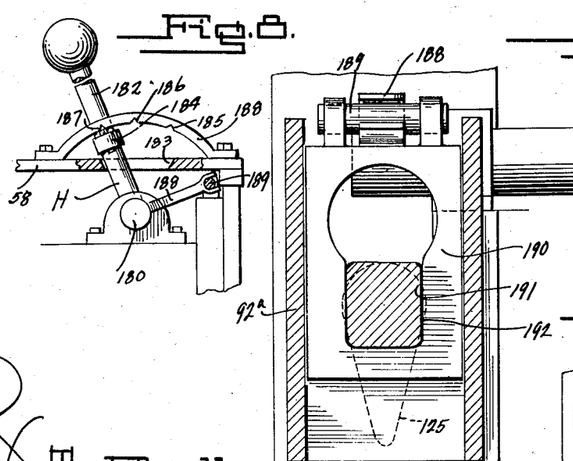
Figure 8 is a fragmentary view of a manual shift lever cooperatively connected with details of this invention.

In order to retain the members 90 and 91 in the proper position against accidental displacement and to aid in stabilizing the desired positions of the gear shift forks 85 and 86, it is preferred to provide spring operated detents in the nature of balls 101 spring urged at 102 in certain notches 103 provided in the reduced ends 92 and 97 of the members 91 and 90 respectively; the springs 102 being held in position in certain sockets of the frame $92^a$ by means of adjusting nuts $105^a$, as is illustrated in Figures 2 and 6 of the drawings.

The frame $92^a$ is provided with a cylinder chamber 105 therein, which reciprocably receives the plunger head 106 of the plunger rod 70 above mentioned; it of course being understood that as the shank 68 is moved incident to flexing of the governor arms 61; the plunger arm 70 and plunger head 106 will be moved thru the compartment or chamber 105. A reciprocating cam controlled pin or member 110 is reciprocably supported by the plunger head 106, transversely extending thru a passageway 107 provided therein, and at its inner and outer ends 111 and 112 extending thru suitable slots 113 and 114 respectively of the casing portion of the frame $92^a$ in which the cylinder chamber 105 is provided. In the plunger head 106 surrounding the pin or member 110 is a pocket in which a compression spring 115 is located, this spring bearing at one end against the plunger head 106, and at its opposite end bearing against a washer 118 held in position by means of radial pin 119 rigid with the pin or member 110, as can readily be seen from the drawings. The one end 111 of the pin or member 110 is provided with a reduced tip 116, which cooperates in connection with a novel type of cam member 125, as will be subsequently described, in effecting reciprocatory movement of the pin or member 110 thru the frame $92^a$ and the plunger head 106. At the opposite end 112 the pin or member 110 is provided with a disc-shaped head or flange 126, which may cooperate against certain lever means for controlling the sliding movement of the gear controlling heads or members 90 and 91.

Referring to the manner in which the plunger member 110 is used for moving the shifting fork 86 for meshing the gear teeth of the gears $42^a$ and 43 in order to drive the shaft C in low speed, a bell crank lever 130 is pivotally supported upon the pin 131. One arm 132 of this bell crank lever at its free end is provided with an adjusting screw 133 which is adapted for contact against the lug or projection 95 of the head 91 of the shifting fork 86. The opposite arm 133 of the bell crank lever 130 has a pivotal connection with a connecting link 135; the link 135 slidably extending thru a pivoted bearing 137, and at its head end 138 co-operating against the disc shaped head 126 of the end 112 of the reciprocating pin 110. It is certainly obvious that when the thrust pin 110 is pushed transversely thru the plunger head 106, in the direction of the link 135, the latter will be acted upon and consequently the bell crank lever 130 rocked to force the adjusting screw 133 against the extension 95 and thus moving the member 91 of the shifting fork 86 longitudinally of the driven shaft C to move the gear 43 into meshing relation with the gear $42^a$ of the counter shaft 38, and thus placing the driven shaft C in a geared connection with the shaft B for low speed driving.

A bell crank lever 140 is pivotally mounted at 141 upon the frame $92^a$. One arm 142 of this bell crank lever 140 has an end 143 adapted for cooperation with the end 112 of the pin 110, when the latter is moved by movement of the plunger 106 to engage the same. It is of course understood, as will be subsequently described, that the cam 125 transversely moves the pin 110 thru the plunger head 106 in order to effect the rocking of the bell crank lever 140. The other arm 145 of the bell crank lever 140 is provided with an adjusting pin 146 which is adapted to be moved upon rocking of the bell crank lever 140, against the extension 100, to move the head 90 of the shifting fork or lever 85 in order to mesh the teeth of the gears 41 and 42, and thus connecting the drive and driven shafts B and C for second speed drive of the latter. A third bell crank lever 147 is pivotally mounted at 148, and includes an arm portion 149 the end or head 150 of which is engaged by the end 112 of the plunger pin 110, as the cam 125 actuates the same, and when the plunger head 106 is moved to permit such cooperation of parts. The lever 147 also includes an arm portion 151 which has a stop pin 152 at the free end thereof adapted to cooperate against the extension 100 of the gear shifting head 90, at the opposite side of said extension or projection 100 from the stop pin 146. Thus, when the plunger pin 110 has been moved by means of movement of the plunger head 106 into the path of the end 150 of the bell crank lever 147, and upon movement of the plunger pin 110 to compress the spring 115, by the cam 125, the bell crank lever 147 will be rocked to engage the extension 100 and thus shift the gear 42 of the transmission mechanism into meshing relation with the gear 36, which is received therein in the conventional manner, for the purpose of effecting the high speed or direct drive of the shafts B and C.

It will be noted from Figures 6 and 7 of the drawings that spiral springs 140ª are provided in connection with each of the shifting angles 130, 140, and 147, these springs being disposed about the pivot points 131, 141, and 148, each being connected to its shifting angle at one end and to the support frame at the opposite end to normally spring the angles back from the lugs 95, and 100, so that said shifting angles will only engage these lugs when in actual use. This is for the purpose of preventing binding of parts.

Referring to the means which operates the cam 125, at the proper time, the clutch pedal 22 is provided with a finger extension 160, adapted to cooperate against a plunger pin 162, when the pedal 22 is rocked for throwing out the clutch, in order to rock a shaft 163 which is connected as by an arm 164ª with the plunger pin 162. The rocking shaft 163 carries a segment 164 having bevel gears 165 on the segment thereof which are in meshing relation with the teeth of a bevel gear 166. The bevel gear 166 is keyed upon a shaft 167; the shaft 167 rotatably bearing at its ends in certain extensions 168 of the frame 92ª, as is illustrated in the drawings. The cam 125 is rigid or integral with the shaft 167, and is of the laterally extending tapered type disposed between the arms 168, and inwardly of a side thereof which cooperates with the tip 116 of the plunger pin 110, the same is recessed to provide grooves 170, 171 and 172. These grooves or recesses are gradually reduced from the axis of the shaft 167 to the free end 173 of the cam 125, so that the ends of said grooves adjacent the shaft 167 are widest and converge to constricted ends adjacent the edge 173 of the cam 125, where said grooves are the narrowest. The pin tip 116 of the plunger pin or member 110 is adapted to operate in each of these grooves 170, 171 and 172 during the automatic gear shifting operating from low to intermediate to high speed.

The normal position of the cam 125 is in a horizontal plane, in the position illustrated in Figure 6, so that the tip end 116 of the plunger pin 110 may enter the proper groove of the cam 125, according to the position which the pin 110 assumes by movement of the plunger 106; the movement of the latter of course being dependent upon the centrifugal force of the governor due to speed of the shaft C. The cam 125 is held in this horizontal position by means of springs 175 which are normally tensioned by connection to the said cam 125 and to the bracket arms 168.

Referring to an operating description of the forward drives of the transmission mechanism, it is to be noted that incident to the normal horizontal positioning of the cam 125, as illustrated in Figure 3 of the drawings, the pin tip 116 will engage in the constricted end of the first groove 170 of the cam 125, and which forces the pin or member 110 to compress its spring 115, and operating the bell crank lever 130 to throw it against the stop lug 95. This shifts the shift fork or member 86 until the gears 42ª and 43 mesh to throw the shafts B and C into low speed. When the motor has been accelerated to justify a shift to second speed, it is merely necessary for the operator to press upon the clutch pedal 22, in order to throw the clutch parts 20 and 21 out of engagement. This rocks the shaft 163 above described, and similarly moves the shaft 167, and throws the cam from the horizontal position downwardly to a vertical position. The spring 115 then of course urges this pin 110 into the positions illustrated in Figures 2 and 7, so that the tip 116 thereof is removed from constricted connection with any of the grooves of the cam 125. Due to the acceleration of the shaft C, the governor arms 61 operate to draw the plunger 106 along its cylinder chamber 105, and thus moving the pin 110 at its tip end 116 past the first groove 170 of the cam 125, to the groove 171. Upon release of the clutch pedal 22, to engage the clutch, it is readily obvious that the cam 125 will return incident to its actuation by its springs 175 to a horizontal position, moving the pin 110 as the cam 125 elevates until said pin 110 rocks the bell crank lever 140 so that its stop 146 engages the lug or extension 100 to push the fork 85 along the shaft C to move the gear 42 in meshing relation with the gear 41, and which of course connects the drive and driven shafts B and C for second speed forward drive. If now, it is desired to drive the shaft C at high speed, the operation is merely repeated of pressing the clutch pedal 22, which disengages the clutch, as well as the cam 125, and incident to the accelerated operation of the governor F the plunger head 106 is moved until the tip end 116 of the slidable member or pin 110 is disposed opposite the groove 172, and upon release of the clutch pedal to engage the clutch, the cam 125 will be returned to catch the tip at the constricted end of the groove 172, forcing the pin or member 110 outwardly to rock the bell crank lever 147, and consequently shift the shift fork 85 until the gears 36 and 42 mesh for a direct high speed drive of the shaft C.

Referring to the manual shift and gear lock mechanism H, the same is an essential part of the gear shift mechanism in order to accomplish the locking of the transmission mechanism in neutral position, and to enable the reverse drive of the shaft C. To this end, a shaft 180 is pivotally supported upon suitable bearings 181; said shaft 180 being horizontally positioned. It is provided with an operating lever or arm 182 which extends upwardly thru an opening 183 in the closure 58 of the gear housing 28. This lever arm 182 is provided with a detent 184 which operates as a spring catch in any one of three notches 185, 186, and 187, formed in an arcuate rack 188, which is carried by the cover of the housing 28; the notches being provided for the purpose of holding the arm 182 in a desired position until manually shifted.

Figures 9, 10, 12:
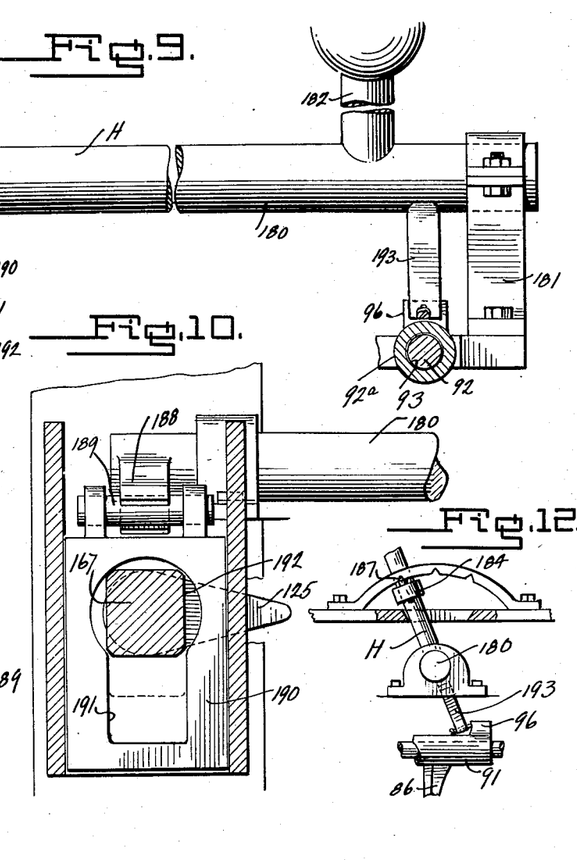
Figure 9 is a fragmentary view, partly in section showing the improved manual shift and gear lock mechanism.
Figure 10 is an enlarged fragmentary sectional view of details of the gear lock mechanism illustrated in Figure 9, but in a different operating position.
Figure 12 is a fragmentary view, partly in section, showing operating details of the manual shift mechanism.
Figure 11:
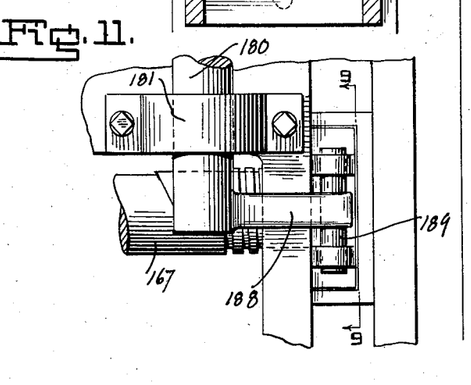
Figure 11 is a fragmentary plan view of the gear lock mechanism details.

In Figures 9, 10 and 11 the shaft 180 is shown with a bifurcated extension 188 projecting laterally therefrom, in the end of which is slidably received a pin or member 189 of a locking gate or bolt 190, which has a slot therein resembling a key hole. The cam supporting shaft 167 at its free end is squared, at 192, as illustrated in Figures 9 and 10 of the drawings, and this squared end of the shaft 167 cooperates in the slot 191 of the locking bolt or member 190. The upper end of the slit 191 is circular in form and within which the squared end 192 of the shaft 167 may rotate freely to permit the right angled shifting of the cam 125 as above described. However, when the clutch pedal 22 is depressed to disengage the clutch parts, the cam 125 will be moved to vertical position, and upon shifting of the manual shift lever 182 to the neutral notch 186, the gate or bolt 190 will be elevated so that the reduced portion of the slot 191 will receive the lower portion of the bolt 192 of the cam shaft 167 to about the dotted line illustrated in Figure 10 of the drawings, to prevent rotation of the shaft, and in this position the cam will be held vertically in an inoperative location with respect to meshing of the gears for any forward speed drive of the shaft C, as can readily be understood. In this position the forward end 192 of the shaft 167 will lie in the slot somewhat along the dotted line illustrated in Figure 10. When it is desired to reverse the drive of the shaft C, the shift lever 182 is moved until the detent 184 engages in the reverse notch 187. With this movement an arm 193 which is carried as a rigid part of the shaft 180 will engage the extension 96 of the portion 91 of the shifting fork 86, to move the gear 43 longitudinally of the shaft C into meshing relation with the reverse gear 47 for reverse drive of the shaft C from the shaft B, as can readily be understood. During this position of reverse drive it is readily apparent that the squared end 192 of the cam shaft 167 is fully seated in the reduced portion of the slot 191 in the position illustrated in Figure 9 of the drawings, to hold the cam 125 out of operative relation to any of the forward speed drive mechanism.

From the foregoing description of this invention it is apparent that a novel type of transmission mechanism has been provided, which embodies a novel automatic gear shift control to effect shifting of gears during the forward speeds. The improved automatic details cooperate in a novel manner with a conventional type of gear shift mechanism. It is of course apparent that the principle of the invention can be used with any number of speeds, more or less than given in the drawings, and that other types of clutch transmission mechanisms may be used than that illustrated and described.

Various changes in the shape, size, and arrangement of parts may be made to the form of the invention herein shown and described, without departing from the spirit of the invention or the scope of the claims.

I claim:

1. In a device of the character described a drive shaft, a driven shaft, transmission gearing connecting the drive and driven shafts for drive of the driven shaft at different speeds, said transmission mechanism including a plurality of independently shiftable gears splined on the driven shaft, a cam, means for moving said cam, a centrifugal governor connected with the driven shaft, a member connected with the centrifugal governor for movement thereby longitudinally of the driven shaft, a pin slidably carried by said member for cooperation with said cam, and means connected with each of the gears splined on the driven shaft against which the pin may engage according to the position of the member actuated by said governor for moving said gears in a predetermined geared connection with the transmission mechanism.

2. In an automatic transmission controlling mechanism the combination of a power shaft, a drive shaft, clutch mechanism between the power shaft and drive shaft, means for throwing out the clutch mechanism to disconnect the power shaft and drive shaft, a driven shaft, gearing connecting the drive and driven shafts including a plurality of selective connections for driving the driven shafts at different speeds with respect to the speed of the drive shaft, a centrifugal governor connected with the driven shaft, means connected with the centrifugal governor for movement longitudinally of the driven shaft upon operation by said governor, a cam, a plunger carried by said means which is moved by the governor for cooperation with said cam, means connected with the operating mechanism of the clutch to move said cam into or out of operating relation with the plunger, and means for each of the plurality of selective connections of the transmission mechanism against which said plunger may successively and automatically engage during the travel of the plunger as it is moved by means of said governor in order to effect the selective geared connections of the drive and driven shafts.

3. In an automatic gear shifting mechanism the combination of a drive shaft, a driven shaft, change speed mechanism between the drive and driven shafts including a plurality of shiftable gears splined on the driven shaft, a governor of the centrifugal type keyed upon the driven shaft, a plunger member associated with said governor for operation longitudinally of the driven shaft upon rotation of said driven shaft, a cam having a plurality of grooves therein, a pin slidable through the plunger for cooperation in the grooves of said cam, lever means connected with the splined gears of said transmission mechanism adapted to be engaged by the pin of said plunger as the plunger is moved and the cam is moved to operate said pin against said lever means whereby to shift the splined gears longitudinally of the driven shaft in a selective manner.

4. In a device of the class described the combination of a power shaft, a drive shaft, clutch mechanism for the power shaft and drive shaft, operating means for said clutch mechanism to release the driving connection of the drive and power shafts, a driven shaft, transmission mechanism between the drive and driven shafts including a plurality of forward speed gear connections and a reverse speed gear connection, means for maintaining said forward and reverse gear connections in a neutral position, a governor, a cam, means connecting the cam for operation by the clutch operating mechanism, a movable member connected with the governor for engagement with said cam, and means for each of said plurality of connections of transmission mechanism for operation by said movable member as the same is positioned by said cam during the operation of said governor.

5. In a change speed gearing the combination of a drive shaft, a driven shaft, a transmission mechanism between the drive and driven shafts including a plurality of forward speed driving connections, a cam, a centrifugal governor, a movable member connected with the centrifugal governor and adapted upon operation of the centrifugal governor to be moved along said cam, said cam being normally operated to force the movable member to effect a forward speed connection for the transmission mechanism, and means for releasing the cam to permit a shifting of the movable member to a different forward speed connection of the transmission mechanism incident to operation of the governor.

6. In a change speed gearing the combination of a drive shaft, a driven shaft, a transmission mechanism between the drive and driven shafts including a plurality of forward speed driving connections, a cam, a centrifugal governor, a movable member connected with the centrifugal governor and adapted upon operation of the centrifugal governor to be moved along said cam, said cam being normally operated to force the movable member to effect a forward speed connection for the transmission mechanism, means for releasing the cam to permit a shifting of the movable member to a different forward speed connection of the transmission mechanism incident to operation of the governor, means to lock said cam in an inoperative position with respect to said movable member to position the transmission mechanism in neutral, and means on said last mentioned means operating to effect a reverse drive of the driven shaft of said transmission mechanism.

7. In an automatic gear shift control the combination of a power shaft, a drive shaft, clutch mechanism including operating means to release the driving connection between the power shaft and drive shaft, a driven shaft, transmission mechanism between the drive and driven shafts including a plurality of gears splined for movement along the driven shaft, a cam having a plurality of grooves in a side thereof substantially in parallel relation, each of said grooves converging to a restricted portion at an end of the cam, means rotatably mounting the cam at the end thereof where the grooves are widest, means for moving the cam upon movement of the operating mechanism of said clutch, a centrifugal governor connected with the driven shaft, means connected with the centrifugal governor for movement therewith longitudinally of the driven shaft, a spring operated plunger carried by said last mentioned means normally urged towards said cam, means to position the cam normally to engage said plunger and force the plunger along its line of travel, independent lever means connected with each of the gears which are splined for movement on said driven shaft, each of said lever means being positioned for engagement by the plunger as it is bodily moved incident to operation of said governor and incident to operation of said cam in its normal position, means for locking the cam in an inoperative position with respect to said plunger, and means when the cam is in an inoperative position to shift the transmission mechanism into reverse.

8. In a change speed gearing the combination of a drive shaft, a driven shaft, change speed mechanism between the drive and driven shafts including means to drive the driven shaft at a plurality of forward speeds and a reverse speed, a centrifugal governor operable by the driven shaft, means movable with the centrifugal governor including a movable member, a plurality of devices between said movable member of the last mentioned means and said transmission mechanism adapted upon movement to operate the different speeds of the transmission mechanism, said member upon movement by the centrifugal governor being adapted to successively align with said devices so that upon movement of the member relative to the means which connects the same to the centrifugal governor said devices may be operated for operating the various speeds of the transmission mechanism, and a manually operated cam device cooperatively located with respect to said member and having a plurality of guide grooves therein adapted to receive the member according to the position which the said member assumes with respect to the various devices above mentioned, whereby upon operation of said cam the same will move to guide the member accurately into alignment for operation of the particular device according to the speed of operation of the centrifugal governor.

ELMER R. MOSHER.